(12) United States Patent
Hasebe et al.

(10) Patent No.: US 12,385,532 B2
(45) Date of Patent: Aug. 12, 2025

(54) ELECTROMAGNETIC BRAKING DEVICE

(71) Applicant: TOKYO MOTRONICS CO., LTD., Nagano (JP)

(72) Inventors: Yoichi Hasebe, Nagano (JP); Tadashi Nakamura, Nagano (JP); Osamu Doi, Nagano (JP)

(73) Assignee: TOKYO MOTRONICS CO., LTD., Nagano (JP)

( * ) Notice: Subject to any disclaimer, the term of this patent is extended or adjusted under 35 U.S.C. 154(b) by 321 days.

(21) Appl. No.: 17/999,862

(22) PCT Filed: Aug. 6, 2021

(86) PCT No.: PCT/JP2021/029262
§ 371 (c)(1),
(2) Date: Nov. 25, 2022

(87) PCT Pub. No.: WO2022/034859
PCT Pub. Date: Feb. 17, 2022

(65) Prior Publication Data
US 2023/0213075 A1    Jul. 6, 2023

(30) Foreign Application Priority Data
Aug. 12, 2020  (JP) .................................. 2020-136512

(51) Int. Cl.
*F16D 63/00*    (2006.01)
*F16D 55/28*    (2006.01)
(Continued)

(52) U.S. Cl.
CPC .......... *F16D 63/004* (2013.01); *F16D 55/28* (2013.01); *F16D 59/02* (2013.01); *F16D 65/186* (2013.01);
(Continued)

(58) Field of Classification Search
CPC .......... F16D 55/02; F16D 55/08; F16D 55/28; F16D 55/30; F16D 59/02; F16D 65/18;
(Continued)

(56) References Cited

U.S. PATENT DOCUMENTS 3,899,061 A * 8/1975 Krug ..................... F16D 27/06
188/164
5,121,018 A    6/1992 Oldakowski
(Continued)

FOREIGN PATENT DOCUMENTS

CN    110332261 A  * 10/2019
DE    20115843 U1  * 12/2001    ........... F16D 66/021
(Continued)

OTHER PUBLICATIONS

JP-H07197965-A; Fujiwara et al. (Year: 1995).*

*Primary Examiner* — Thomas J Williams
(74) *Attorney, Agent, or Firm* — HAUPTMAN HAM, LLP

(57) ABSTRACT

An electromagnetic braking device includes a brake disk, a fixed disk, an armature, a biasing member for biasing the armature, and a stator for attracting the armature. In a stator magnetic circuit member, a first yoke, a permanent magnet, and a second yoke are arranged in this order from one end to the other end of a U shape. In a rotatable state or a rotation braking state, even when the coil energization is OFF, the rotatable state or the rotation braking state is maintained. When a current of a predetermined magnitude flows through the coil in a first direction in the rotatable state, the state shifts to the rotation braking state, and when a current of a
(Continued)

predetermined magnitude flows through the coil in a second direction in the rotation braking state, the state shifts to the rotatable state.

10 Claims, 5 Drawing Sheets

(51) Int. Cl.
 *F16D 59/02* (2006.01)
 *F16D 65/18* (2006.01)
 *H01F 7/122* (2006.01)
 *H02K 7/102* (2006.01)
 *F16D 55/08* (2006.01)
 *F16D 121/22* (2012.01)
 *F16D 129/06* (2012.01)

(52) U.S. Cl.
 CPC ............ *H01F 7/122* (2013.01); *H02K 7/1025* (2013.01); *F16D 55/08* (2013.01); *F16D 2121/22* (2013.01); *F16D 2129/065* (2013.01)

(58) Field of Classification Search
 CPC ............... F16D 65/186; F16D 2121/22; F16D 2129/065; F16D 2129/08; H02K 7/1025; H01F 7/122
 See application file for complete search history.

(56) References Cited

U.S. PATENT DOCUMENTS

| | | | |
|---|---|---|---|
| 5,185,542 A | | 2/1993 | Lazorchak |
| 5,490,583 A * | | 2/1996 | Anderson ............... F16D 59/00 188/164 |
| 5,577,578 A * | | 11/1996 | Lazorchak .............. F16D 55/28 188/164 |
| 8,151,950 B2 * | | 4/2012 | Fargo ...................... B66D 5/30 188/164 |
| 8,205,727 B2 * | | 6/2012 | Berndt ................... F16D 55/02 188/164 |
| 9,903,429 B2 * | | 2/2018 | Uffelman ................ F16D 65/18 |
| 2010/0252379 A1 * | | 10/2010 | Piech ....................... B66D 5/30 188/161 |
| 2015/0152930 A1 | | 6/2015 | Uffelman |
| 2023/0213075 A1 * | | 7/2023 | Hasebe ................ F16D 65/186 188/70 R |

FOREIGN PATENT DOCUMENTS

| | | | | |
|---|---|---|---|---|
| DE | 202004001042 U1 * | 7/2004 | .......... H02K 7/1025 |
| JP | S57122836 U | 7/1982 | |
| JP | H07197965 A * | 8/1995 | ......... F16D 2121/22 |
| JP | H9229105 A | 9/1997 | |
| JP | 2010144852 A | 7/2010 | |
| JP | 2018507363 A | 3/2018 | |
| JP | 2019199957 A | 11/2019 | |

* cited by examiner

ELECTROMAGNETIC BRAKING DEVICE

RELATED APPLICATIONS

The present application is a National Phase of International Application No. PCT/JP2021/029262 filed Aug. 6, 2021, which claims priority to Japanese Application No. 2020-136512, filed Aug. 12, 2020.

TECHNICAL FIELD

The present invention relates to a self-maintaining electromagnetic braking device.

BACKGROUND ART

An electromagnetic braking device is known as a device that brakes movement of a rotation shaft (for example, a motor shaft, a wheel shaft, and the like) of a braking target (for example, a motor, a vehicle, and the like).

A conventional electromagnetic braking device (non-excitation actuation type), for example, as described in Patent Documents 1 to 3, includes a brake disk rotatable integrally with a rotation shaft and slidable along a central axis of the rotation shaft, a fixed disk disposed facing one side of, and coaxially with, the brake disk, an armature disposed opposite to the other side of, and coaxially with, the brake disk and slidable along the central axis, a coil spring pressing the armature in a direction in which the brake disk is disposed, and an electromagnet that is disposed at a side of the armature opposite from the side at which the brake disk is disposed, that can generate a magnetic force for attracting the armature in a direction away from the brake disk, and that includes a coil and a yoke.

In the conventional electromagnetic braking devices (non-excitation actuation types), when the electromagnet is not excited, the armature is biased by a biasing force of the coil spring, and by this the brake disk is sandwiched between and in contact with the armature and the fixed disk, thereby braking the rotation of the rotation shaft. On the other hand, when the electromagnet is excited, the magnetic force is generated from the electromagnet that attracts the armature, the armature moves toward a stator against the above-described biasing force of the coil spring, the brake disk is released from contact between the armature and the fixed disk, and the rotation shaft becomes rotatable.

However, according to the conventional electromagnetic braking device (non-excitation actuation type), while in the rotatable state, it is necessary to always continuously supply a current to the coil of the electromagnet. Therefore, it cannot be said that power saving is achieved.

As a solution to such a problem, there has been proposed a so-called "self-maintaining type" electromagnetic braking device that does not use a coil spring and that consumes electric power only when the state transitions between an activated state and a non-activated state (rotatable state) of the brake (see, for example, Patent Document 4).

PRIOR ART LITERATURE

Patent Documents

Patent Document 1: JP-A-57-122836.
Patent Document 2: JP-A-2010-144852
Patent Document 3: JP-A-2019-199957
Patent Document 4: JP-A-9-229105

SUMMARY OF INVENTION

Problems to be Solved by Invention

FIG. 6 is a diagram illustrating a configuration of an electromagnetic braking device 900 described in Patent Document 4. Although detailed description is omitted, the electromagnetic braking device described in Patent Document 4 has the following problems because the armature is a bobbin type.

(a) A second flange portion 932, which is in the vicinity of one end 961 and another end 962 of a stator magnetic circuit member 960, which is a location (also referred to as a point of effort) of the magnetic circuitry that contributes to switching between activated and non-activated states of the brake, and a brake contact surface 931a of a first flange portion 931, which is a location (also referred to as a working point) that presses against a hub 916 and contributes to braking of a rotating portion, are physically separated from each other. Therefore, it is not always possible to obtain a strong braking force as in the above-described non-excitation actuation type electromagnetic braking device.

(b) Since the armature 930 is a bobbin type, the first flange portion 931 and the second flange portion 932 serve to restrict the movement of each other. Therefore, when the brake contact surface 931a at the first flange portion 931 side is in contact with a friction member 913 in the brake activated state, it is necessary to secure an air gap 9b at the second flange portion 932 side, in between a surface 932b on the other side of the second flange portion 932 and the other end 962 of the stator magnetic circuit member 960. An air gap 9a is also present on the opposite side, with the second flange portion 932 sandwiched therebetween. Therefore, a magnetic resistance in the magnetic circuit increases due to the air gaps 9a and 9b, and the magnetic flux that passes through them decreases accordingly, and as a result, a sufficient attracting force cannot always be obtained. Therefore, the strong braking force cannot always be obtained.

(c) When the friction member 913 wears down, there is a possibility that the air gap 9b may decrease and eventually become 0 (zero). If this happens, then a pressing force against the hub 916 becomes weak, and the braking force cannot be stably exerted.

(d) Since the armature 930 needs to move in a direction parallel to the central axis AX, it is necessary to secure a clearance 9c between a permanent magnet 933 and an end portion (not shown) of the second flange portion 932. Note that reference numerals 934 indicated at both sides of the permanent magnet 933 are spacers, and do not function as yokes. When viewed from the permanent magnet 933, the stator magnetic circuit member 960 and the second flange portion 932 are what function as yokes. Since the clearance 9c is required in this way, the magnetic resistance in the magnetic circuits increases, and the magnetic flux that passes through reduces accordingly, and as a result, the sufficient attracting force cannot always be obtained. Therefore, the strong braking force cannot always be obtained.

The present invention takes the above-described circumstances into consideration, and an object thereof is to provide the electromagnetic braking device that stably exerts the strong braking force while saving power.

Means for Overcoming the Problems

According to one aspect of the present invention, there is provided an electromagnetic braking device for braking movement of a rotation shaft of a braking target, the electromagnetic braking device is provided that includes a brake disk rotatable integrally with the rotation shaft and slidable along a central axis of the rotation shaft, a fixed disk disposed facing one side of, and coaxially with, the brake disk, an armature disposed facing another side of, and coaxial with, the brake disk, and slidable along the central axis, a biasing member for biasing the armature in a direction in which the brake disk is disposed, and a stator disposed with respect to the armature on a side opposite to a side where the brake disk is disposed, and capable of generating a magnetic force for attracting the armature in a direction away from the brake disk.

Here, the stator includes a coil and a stator magnetic circuit member, which includes a first yoke, a permanent magnet, and a second yoke. The stator magnetic circuit member has a substantial U shape that surrounds the coil in a cross-sectional view of a surface obtained by cutting by a plane including the central axis and is disposed so that one end surface on one end side, and another end surface on another end side, of the U shape face the armature. Elements of the stator magnetic circuit member are arranged, from one end to another end of the U shape, in the order of the first yoke, the permanent magnet, and the second yoke.

The electromagnetic braking device is configured so that (i) in a rotatable state in which the rotation shaft is rotatable, the armature is held in contact with the one end surface and the other end surface of the stator magnetic circuit member even while energization to the coil is OFF, (ii) when, while in the rotatable state, a current of a predetermined magnitude in a first direction flows through the coil, the armature moves toward the brake disk and contacts the brake disk to shift to a rotation braking state in which rotation of the rotation shaft is braked, (iii) in the rotation braking state, the brake disk is held in a state of being sandwiched between the armature and the fixed disk while being in contact therewith even while energization of the coil is OFF, and (iv) when, while in the rotation braking state, a current having a predetermined magnitude flows through the coil in a second direction opposite to the first direction, the armature moves toward the stator, and the brake disk is released from contact between the armature and the fixed disk to shift to the rotatable state.

According to another aspect of the present invention, the electromagnetic braking device is configured so that (a) in a rotatable state in which the rotation shaft is rotatable, a magnitude of a force attracting the armature by a magnetic circuit that uses the permanent magnet as a magnetomotive force source exceeds a magnitude of a force (biasing force) biasing the armature by a biasing member, (b) when transitioning from the rotatable state to a rotation braking state in which rotation of the rotation shaft is braked, the magnitude of the force attracting the armature by the magnetic circuit with the permanent magnet and the coil as the magnetomotive force source is smaller than the magnitude of the above-described biasing force, (c) in the rotation braking state, the magnitude of the force attracting the armature by the magnetic circuit that uses the permanent magnet as the magnetomotive force source is smaller than the magnitude of the biasing force, and (d) when transitioning from the rotation braking state to the rotatable state, the magnitude of the force attracting the armature by the magnetic circuit that uses the permanent magnet and the coil as the magnetomotive force source exceeds the magnitude of the above-described biasing force.

Effects of the Invention

According to the present invention, it is possible to provide a power-saving electromagnetic braking device that stably exerts the strong braking force while saving power.

EMBODIMENT OF INVENTION

Hereinafter, an embodiment of an electromagnetic braking device according to the present invention will be described with reference to the drawings. Each drawing is a schematic diagram illustrating an example, and does not necessarily strictly reflect actual dimensions, ratios, and the like.

1. Configuration of Electromagnetic Braking Device 1 According to the Embodiment (1) Outline of Electromagnetic Braking Device 1

An electromagnetic braking device 1 according to the embodiment is an electromagnetic braking device that brakes movement of a rotation shaft (a shaft of a motor, a shaft of a wheel, or the like) of a braking target (a motor, various vehicles, or the like) which is not illustrated.

Figure 1A:
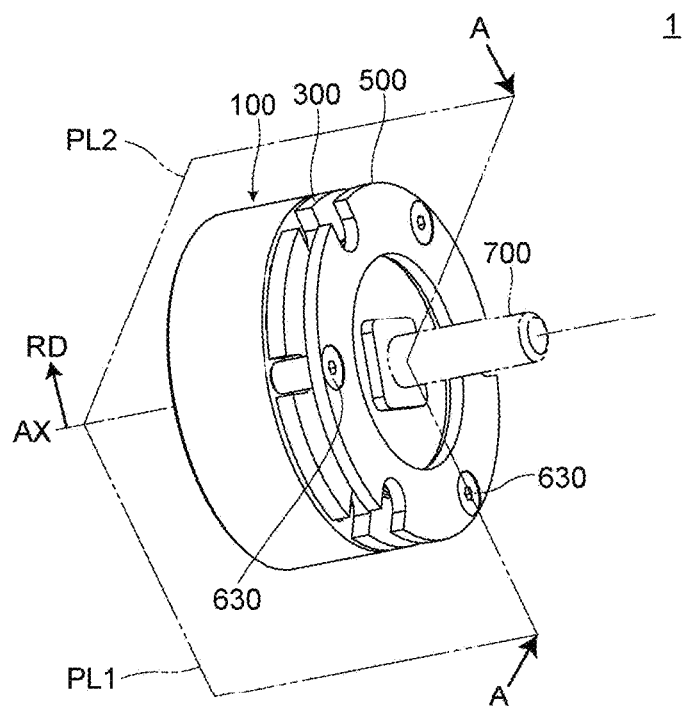
FIGS. 1A and 1B are perspective views of an electromagnetic braking device 1 according to an embodiment.
Figure 1B:
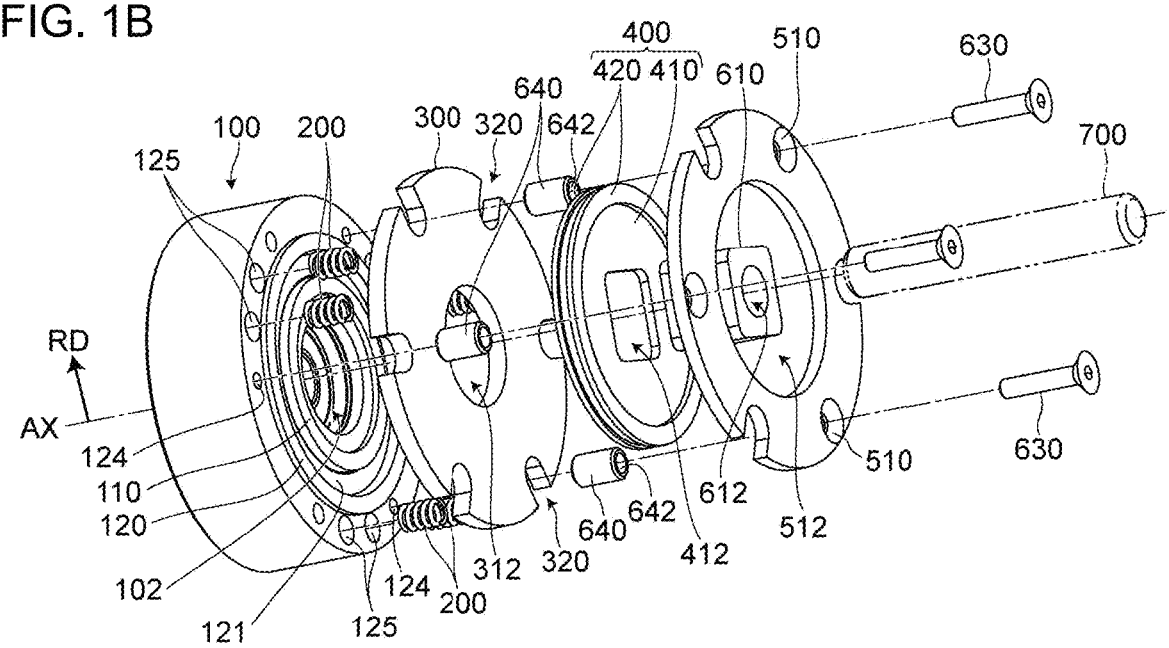
Figure 2:
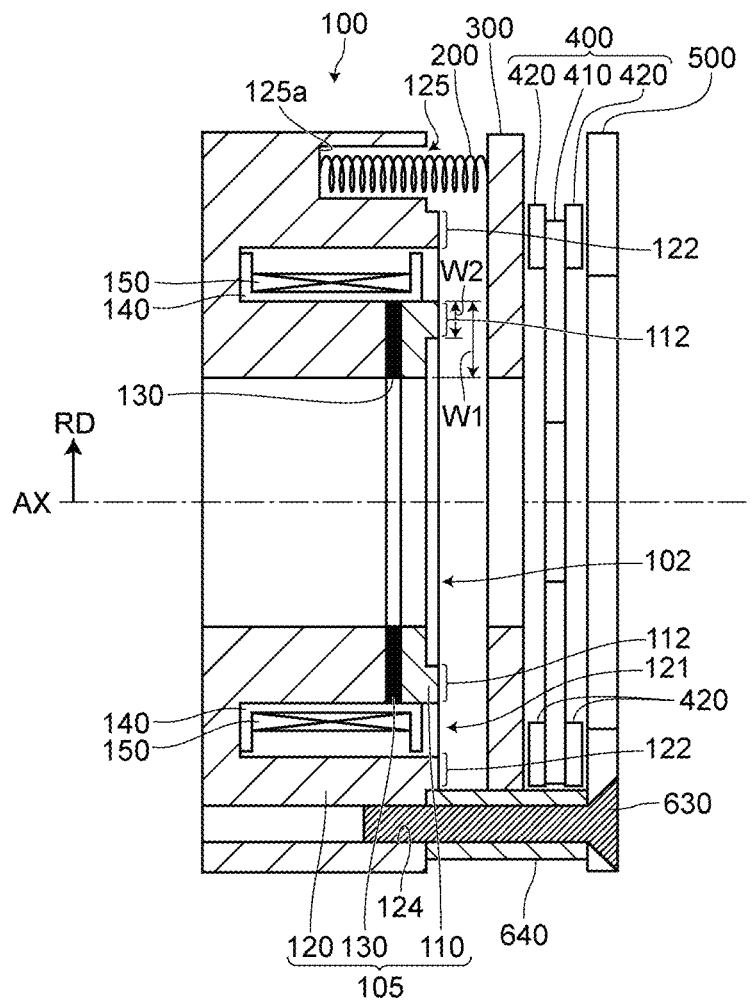
FIG. 2 is an A-A cross-sectional view of the electromagnetic braking device 1 according to the embodiment, when two virtual planes indicated by PL1 and PL2 in FIG. 1A are developed and viewed along arrow A.

FIGS. 1A and 1B are perspective views of the electromagnetic braking device 1 according to the embodiment. FIG. 1A is a view showing an external appearance of the electromagnetic braking device 1, and FIG. 1B is a view when the electromagnetic braking device 1 is disassembled along a central axis AX of a rotation shaft (shaft 700). In FIGS. 1A and 1B, lead wires are not shown. FIG. 2 is an A-A cross-sectional view of the electromagnetic braking device 1 according to the embodiment when two virtual planes indicated by PL1 and PL2 in FIG. 1A (virtual planes including a bolt screw 630, the central axis AX, and a coil spring 200) are developed and viewed from arrows A. FIG. 2 shows a rotation braking state. Illustration of ribs, shafts, bearings and the like is omitted.

As shown in FIGS. 1A, 1B and 2, the electromagnetic braking device 1 includes a stator 100, an armature 300, a brake disk 400, and a fixed disk 500, which are arranged along the central axis AX of the rotation shaft (shaft 700) in this order from the left side to the right side of the drawing. The coil springs 200 as a biasing member are disposed in spring holes 125 of the stator 100 (see FIGS. 1B and 2).

The rotation shaft (shaft 700) is not necessarily an essential component of the electromagnetic braking device 1, but is shown together with other components in FIGS. 1A and 1B to facilitate understanding. Hereinafter, the shaft may be referred to as a rotation shaft 700, and the rotation shaft may be referred to as a shaft 700. Similarly, the coil springs may be referred to as a biasing member 200, and the biasing member may be referred to as the coil springs 200. These are interchangeable with each other.

When the electromagnetic braking device 1 is used, for example, the stator 100 may be fixed to an appropriate fixing portion (such as a fixing section of the braking target), the shaft 700 of the braking target may be inserted into an opening 612 of a hub 610 (to be described later), and the shaft 700 may be fixed to the hub 610 by a bolt screw through a screw hole (not shown). Further, when the shaft 700 is inserted into the hub 610 of the electromagnetic braking device 1 in advance as shown in FIGS. 1A and 1B, the shaft 700 may be connected to the rotating portion of the braking target using a coupling or the like.

Once the electromagnetic braking device 1 is fixed and connected to the braking target as described above, the armature 300 is set to move (details will be described later) when a current of a predetermined magnitude in an intended direction is supplied to a coil 150 (to be described later) from outside through a lead wire (not shown). "Fixed and connected" here may be fixed and connected directly or fixed and connected indirectly via another component.

The brake disk 400 rotates together with the hub 610 integrally with the rotation shaft 700 about the central axis AX. When the armature 300 moves toward the fixed disk 500 and contacts the brake disk 400 while sandwiching the brake disk 400 with the fixed disk 500, movement of the brake disk 400 is braked by frictional force between it and both the armature 300 and the fixed disk 500. By this, movement of the rotation shaft 700 is also braked indirectly (rotation is decelerated, rotation is stopped, or movement in the rotation direction is restricted). On the other hand, when the armature 300 moves toward the stator 100, the brake disk 400 is released from the contact between the armature 300 and the fixed disk 500 and becomes rotatable. Accordingly, the rotation shaft 700 indirectly becomes rotatable.

Hereinafter, detailed description of each component of the electromagnetic braking device 1 will continue with a focus on structure.

(2) Brake Disk 400

The brake disk 400 is rotatable integrally with the rotation shaft 700 and is slidable along the central axis AX of the rotation shaft 700. The brake disk 400 is substantially ring-shaped and has a friction surface on one side that contacts the fixed disk 500 and a friction surface on the other side that contacts the armature 300.

The brake disk 400 includes a spacer disk 410 and brake pads 420, which are disposed on both surfaces of the spacer disk 410 so as to sandwich the spacer disk 410.

The brake pads 420 are formed in a ring shape having a constant width, one surface of each is intimately fixed to the spacer disk 410, and the other surface (front surface) of each forms the above-described friction surfaces. It is desirable that the brake pads 420 be a material having a relatively high coefficient of friction and yet be highly durable. A width of the brake pads 420 is much smaller than a width of the spacer disk 410. The spacer disk 410 is substantially ring-shaped, and has a substantially quadrangular opening 412 formed at the center thereof in conformity with the contour of the hub 610 (to be described later) (see FIG. 1B). The spacer disk 410 may be made of either a non-magnetic material or a soft magnetic material.

It should be noted that provision of the brake pads 420 may be omitted from the brake disk 400, and the brake disk 400 may be constituted by only the spacer disk 410.

(3) Hub 610

The hub 610 has a central through hole and the shaft 700 can be inserted through an opening 612 of the central through hole. The inserted shaft 700 can be fixed to the hub 610 by a fixing screw (not shown).

The outer shape of the hub 610 is a substantially quadrangular prism, but the four corners thereof are formed in contour shapes substantially equivalent to arcs centered on the central axis AX, which is the center of the central through hole (strictly speaking, they may not be perfect arcs, but may be shapes simply chamfered in straight lines), and align with the opening of the opening 412 in the spacer disk 410 described above. The outer dimension of the hub 610 having a substantially rectangular outline shape is set to be slightly smaller than the dimensions of the opening 412 of the spacer disk 410 so that the hub 610 can be fitted into the opening 412 of the spacer disk 410.

Since the spacer disk 410 (and thus the brake disk 400) and the hub 610 have such a relationship, the brake disk 400 is restrained by the hub 610 in the rotational direction and rotates integrally with the hub 610 (and thus with the rotation shaft 700). On the other hand, in the thrust direction, the brake disk 400 can slide along the central axis AX.

(4) Fixed Disk 500

The fixed disk 500 is disposed facing one side of, and coaxial with, the brake disk 400. The fixed disk 500 has a substantially ring shape with an opening at the center, and an opening 512 enables the shaft 700, the hub 610, and the like to pass through without interfering with them.

The side of the fixed disk 500 on which the brake disk 400 is disposed has a friction surface (not shown) that comes into contact with the brake disk 400. The fixed disk 500 is provided with three countersink holes 510 at intervals of 120°, and bolt screws 630 can be inserted into the countersink holes 510 from the side opposite to the side of the fixed disk 500 provided with the friction surface.

The bolt screws 630 pass through inner holes 642 of cylindrical collars 640 and are screwed into screw holes 124 provided in the stator 100 (a second yoke 120 on the outer peripheral side), whereby the fixed disk 500 is fixed to the stator 100 while maintaining a separation distance defined by the height of the collar 640.

(5) Armature 300

The armature 300 is disposed facing the other side of, and coaxial with, the brake disk 400. The armature 300 is made of a soft magnetic material. The armature 300 has a substantial ring shape with an opening at the center, and an opening 312 enables the shaft 700, the hub 610 and the like to pass through without interfering with them.

The side of the armature 300 on which the brake disk 400 is disposed has a friction surface (not shown) that comes into contact with the brake disk 400. The surface opposite to the surface on which the friction surface is provided has a contact surface that comes into contact with the yokes (110, 120) of the stator 100 (to be described later), a surface that receives a biasing force of the coil springs 200 (to be described later), and the like.

The outer peripheral edge of the armature 300 is provided with notches 320 at positions corresponding to the collars 640. The collars 640 are loosely engaged in the notches 320, and when the armature 300 is moved by the biasing force of the coil springs 200 or an attracting force of the stator 100 (details will be described later), the armature 300 is guided by the collars 640 via the notches 320 and can slide in the thrust direction along the central axis AX.

(6) Coil Springs 200 (Biasing Member)

The coil springs 200, as a biasing member, are dropped into circular concave spring holes 125 provided in the second yoke 120 of the stator 100 (to be described later), one end of each is brought into contact with and regulated by spring walls 125a, which are the bottom of the spring holes 125, and the other ends protrude from the spring holes 125 toward the armature 300 along the central axis AX and contact the armature 300 (see FIG. 2).

The other end side of the coil springs 200 can expand and contract along the central axis AX with movement of the armature 300, toward and away from the side where the armature 300 is disposed.

The coil springs 200, as a biasing member, press the armature 300 in the direction in which the brake disk 400 is disposed. Note that in this specification, pressing the armature 300 in the direction in which the brake disk 400 is disposed is referred to as "biasing", and this pressing force is referred to as "biasing force fsp or spring force fsp".

Although the coil springs 200 have been described as the biasing member in the embodiment, the biasing member is not limited thereto. For example, the biasing member may be realized by a leaf spring, an appropriate actuator, or the like.

(7) Stator 100

The stator 100 is disposed with respect to the armature 300 on a side opposite to a side where the brake disk 400 is disposed, and can generate a magnetic force for attracting "the armature 300 in a direction away from the brake disk." In this specification, the force for attracting the armature 300 is referred to as "attracting force fsc". As shown in FIG. 2, the stator 100 generally includes a coil 150 and a stator magnetic circuit member 105, which includes a first yoke 110, a permanent magnet 130, and the second yoke 120.

(7-1) The coil 150 excites members constituting a magnetic circuit (details will be described later), such as the stator magnetic circuit member 105 and the armature 300, by supplying and energizing a current of a predetermined magnitude in an intended direction from the outside via a lead wire (not shown). The coil 150 may be obtained by using a bobbin 140 and winding an electric wire around the central axis AX following a rail of the bobbin 140. Note that the bobbin 140 is made of an insulating material.

(7-2) The stator magnetic circuit member 105 has a substantial U shape that surrounds the coil 150 in a cross-sectional view of a surface obtained by cutting by a plane including the central axis AX (the state as shown in FIG. 2), and is disposed so that one end surface 112 on one end side of the U shape and the other end surface 122 on the other end side face the armature 300. The elements of the stator magnetic circuit member 105 are arranged, from one end (closer to the rotation shaft) to the other end (farther from the rotation shaft) of the U shape described above, in the order of the first yoke 110 (inner circumferential yoke), the permanent magnet 130, and the second yoke 120 (outer circumferential yoke).

Note that it is desirable that the permanent magnet 130 is disposed to one side of the one end of the U shape close to the central axis AX of the rotation shaft 700 and at a position closer to the one end surface.

Here, the cross-sectional shape of the stator magnetic circuit member 105 has the "substantial U shape" in the sense that the one end surface 112 on one end side and the other end surface 122 on the other end side face the armature 300, and the member that connects the one end surface 112 and the other end surface 122 is closed and continuous without any particular air gap. In this sense, shapes that are near an approximate C shape or an approximate dog-leg shape are also included in the "substantial U shape" referred to here. Further, the "stator magnetic circuit member 105" herein refers to a general member constituting a magnetic circuit (details will be described later), and is a concept including a permanent magnet in addition to yokes. The first yoke 110 and the second yoke 120 are made of a soft magnetic material.

(7-3) Although the cross-sectional shape of the stator magnetic circuit member 105 is as described above, the stator magnetic circuit member 105 as a whole has a substantial ring shape or a substantial cylindrical shape with an opening at the center (see FIGS. 2 and 1B). A ball bearing (not shown) is embedded in an opening 102 of the stator magnetic circuit member 105, an outer ring of the ball bearing is fixed to the stator magnetic circuit member side, and an inner ring of the ball bearing is fixed to the shaft 700.

(7-4) Similarly, the second yoke 120 overall has a substantial ring shape or a substantially cylindrical shape having an opening at the center, and an annular recessed groove 121 having an opening at the armature 300 side is formed. An outer peripheral (in the RD direction) wall of the second yoke 120 that forms the annular recessed groove 121 constitutes the "other end" of the stator magnetic circuit member 105, and a surface of the other end that faces the armature 300 is the "other end surface 122" of the stator magnetic circuit member 105. The other end surface 122 is the surface that contacts the armature 300. A width of the other end surface 122 is set to be smaller (narrower) than a width of the second yoke 120 other than the other end surface 122 (the width of the wall closer to the outer periphery).

The coil 150 is accommodated in the annular recessed groove 121 together with the bobbin 140.

The wall closer to the center (toward the —RD direction) that forms the annular recessed groove 121 is one step lower than the wall to the outer periphery (in the RD direction), the ring-shaped permanent magnet 130 is stacked in the lower step toward the center, and the ring-shaped first yoke 110 is further stacked so as to sandwich the permanent magnet 130 between itself and the second yoke 120.

The circular concave spring holes 125 are formed in the second yoke 120. Further, the second yoke 120 is formed with the screw holes 124, which can be screwed into by the bolt screws 630.

(7-5) The permanent magnet 130 has a slightly flattened ring shape, and for example, a permanent magnet that is magnetized so that one surface becomes an N pole and the other surface becomes an S pole can be employed.

The permanent magnet 130 is disposed such that a magnetic axis connecting the positive magnetic pole (N pole) and the negative magnetic pole (S pole) of the permanent magnet 130 to each other coincides with a direction in which the first yoke 110, the permanent magnet 130, and the second yoke 120 are stacked (left-right direction in FIG. 2). In the example of the embodiment, the permanent magnet 130 is arranged so that the positive magnetic pole (N pole) appears on the side where the fixed disk 500 is arranged (the side where the first yoke 110 is stacked to the right side in FIG. 2) and the negative magnetic pole (S pole) appears on the opposite side (the side where the second yoke 120 is stacked to the left side in FIG. 2). Note that the arrangement of the positive magnetic pole and the negative magnetic pole may be reversed as long as the control of the energization to the coil 150 described later is matched.

(7-6) The first yoke 110 as a whole has a substantially ring shape with an opening at the center, and has a substantially cup shape on the side facing the armature 300 with the portion closer to the center being one step lower than the edge closer to the outer periphery. The edge portion closer to the outer periphery constitutes "one end" of the stator magnetic circuit member 105, and the end surface thereof constitutes "one end surface 112" of the stator magnetic circuit member 105. The one end surface 112 is the surface that contacts the armature 300.

(7-7) A width W2 of the one end surface 112 is set to be smaller (narrower) than an overall width (in this example, substantially the same as a width W1 of the permanent magnet 130) of the first yoke 110 including the one end surface 112.

In addition, the electromagnetic braking device 1 is configured so that W2<W1, wherein, in a cross-sectional view of a surface obtained by cutting the electromagnetic braking device by a plane including the central axis, W1 is the width of the permanent magnet 130 in a direction perpendicular to the central axis AX and W2 is the width of the one end surface 112 of the first yoke 110, or the other end surface 122 of the second yoke 120, in the direction perpendicular to the central axis AX. It is further desirable that W2<(W1/2).

2. Functions of the Electromagnetic Braking Device 1 According to the Embodiment Next, functions of the electromagnetic braking device 1 will be sequentially described with reference to FIGS. 3A to 3H and FIG. 4.

FIGS. 3A to 3H are diagrams for explaining functions of the electromagnetic braking device 1 according to the embodiment. FIGS. 3A, 3C, 3E, and 3G are enlarged cross-sectional views of main parts corresponding to a first phase to a fourth phase, respectively. Note that the components in this drawing are schematically shown, and therefore have different dimensions, ratios, and the like from those of FIGS. 1A, 1B and 2. FIGS. 3B, 3D, 3F, and 3H are diagrams of magnetic circuits equivalent to the electromagnetic braking device 1 corresponding to the first phase to the fourth phase, respectively.

(1) Magnetic Circuit Equivalent to Electromagnetic Braking Device 1

First, in describing functions of the electromagnetic braking device 1, a magnetic circuit equivalent to the electromagnetic braking device 1 will be described first.

Since the electromagnetic braking device 1 adopts the structure as described above, it constitutes one closed "magnetic circuit".

"Magnetic circuit" refers to a circuit formed by a path of an N pole of the permanent magnet 130, the first yoke 110, air gap AG between the one end surface 112 and the armature 300, the armature 300, the air gap AG between the armature 300 and the other end surface 122, the second yoke 120, and an S pole of the permanent magnet 130 using the permanent magnet 130 and the coil 150 as magnetomotive force sources. However, the orientation of the magnetic poles is based on the assumption of the magnetic pole arrangement of the permanent magnet exemplified above.

Here, the magnetomotive force of the permanent magnet 130 is Fmg, the magnetomotive force of the coil is Fc, the magnetic resistance by the first yoke 110, the armature 300, and the second yoke 120 among the magnetic resistances of the paths constituting the magnetic circuit (that is, the same as the total resistance when the armature 300 is in contact with the one end surface 112 and the other end surface 122 of the stator magnetic circuit member 105) is RCON, the magnetic resistance of the air gap AG portion when the armature 300 separates from the stator 100 even slightly is RAG, and a magnetic flux passing through the magnetic circuit is Φ (See FIG. 2 and FIGS. 3A to 3H, to be described later).

In the present embodiment, it is assumed that Fmg is constant, Fc varies depending on the direction and magnitude of the current flowing through the coil, RCON is constant, RAG varies depending on the size of the air gap AG, and 0 (to which a number corresponding to the phase number is attached) can vary depending on the state.

(1-1) Magnetic Circuit of First Phase

Figure 3A:
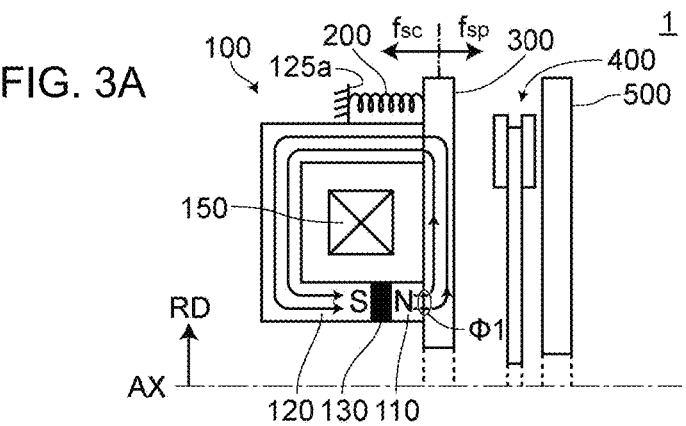
FIGS. 3A to 3H are diagrams for explaining functions of the electromagnetic braking device 1 according to the embodiment.
Figure 3B:
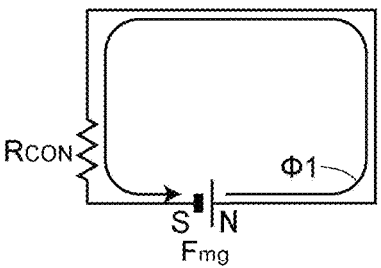

As shown in FIG. 3A, when the armature 300 is completely attracted to the stator 100, the rotation shaft is rotatable. This state is referred to as a "rotatable state". An equivalent magnetic circuit when no current is supplied to the coil 150 in the rotatable state is as shown in FIG. 3B, and the magnetomotive force is only Fmg from the permanent magnet 130 (the magnetic circuit that uses the permanent magnet as a magnetomotive force source). Since the air gap AG is 0 (zero), RAG is also 0 (zero), and the total magnetic resistance is only RCON. The magnetic flux at this time is Φ 1.

(1-2) Magnetic Circuit of Second Phase

Figure 3C:
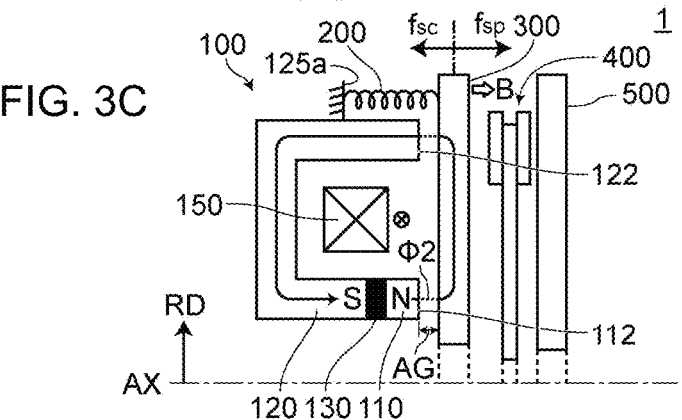
Figure 3D:
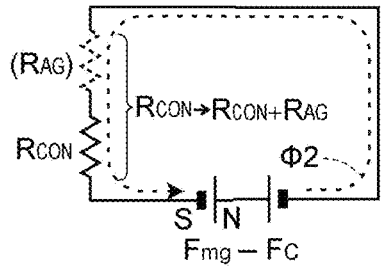

As shown in FIG. 3C, when a current having a predetermined magnitude flows through the coil 150 in a first direction (here, the direction from the front surface to the back surface of the drawing sheet) in the rotatable state of the first phase, the armature 300 starts to move toward the brake disk 400 (arrow B). The magnetic circuit equivalent to this state is as shown in FIG. 3D. The magnetomotive force in this circuit is Fmg from the permanent magnet 130 and the magnetomotive force Fc from the coil 150 in the direction in which the magnetomotive force Fmg of the permanent magnet is reduced, and the total magnetomotive force obtained by combining these is Fmg-Fc (the magnetic circuit that uses the permanent magnet and the coil as the magnetomotive force source). Since the air gap AG appears, RAG also changes from a state of 0 (zero) to a state of having a value, and the total magnetic resistance becomes RCON+RAG. The magnetic flux at this time is Φ 2. The value of the magnetic flux Φ 2 at this time is smaller than the value of the magnetic flux Φ 1. Therefore, the attracting force fsc is weaker than that in the first phase. Generally, it is known that the larger the air gap in the magnetic circuit, the smaller the attracting force acting on the armature. This is because when an air gap is large, the magnetic resistance of the whole magnetic circuit becomes large, and accordingly, the magnetic flux that passes near the air gap AG is reduced and the attracting force is reduced.

(1-3) Third Phase Magnetic Circuit

Figure 3E:
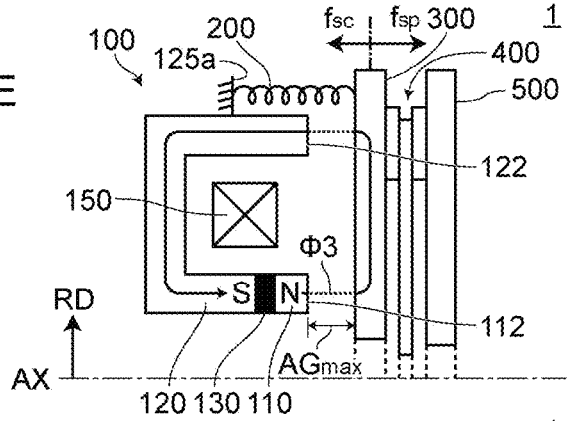
Figure 3F:
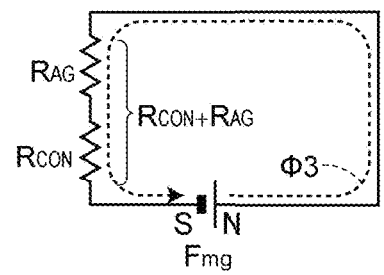

As shown in FIG. 3E, when the armature 300 presses the brake disk 400 and the brake disk 400 is completely sandwiched between the armature 300 and the fixed disk 500 while contacting them, the rotation of the rotation shaft is braked. This state is referred to as a "rotation braking state". The equivalent magnetic circuit when no current is supplied to the coil 150 during the rotation braking state is as shown in FIG. 3F, and the magnetomotive force is only Fmg from the permanent magnet 130 (the magnetic circuit that uses the permanent magnet as the magnetomotive force source). The magnetic resistance RAG corresponding to the air gap AG becomes a value corresponding to the maximum value AGmax of the air gap, and the total magnetic resistance becomes RCON+RAG(AG=AGmax). The magnetic flux at this time is Φ 3. In general, $\Phi 3 \leq \Phi 2 \leq \Phi 1$.

(1-4) Fourth Phase Magnetic Circuit

Figure 3G:
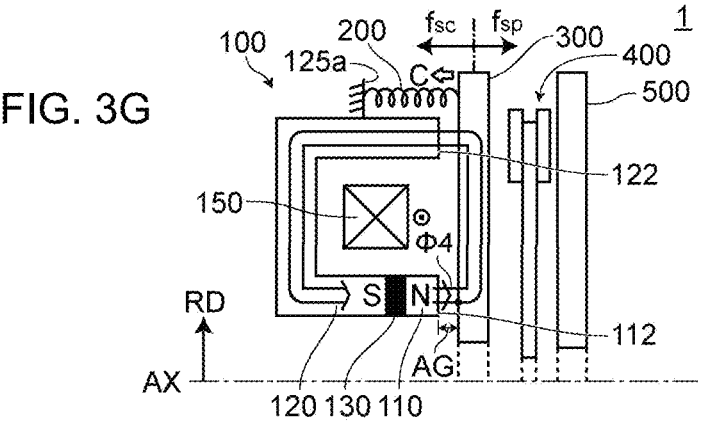
Figure 3H:
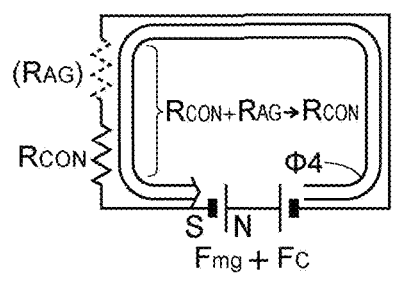

As shown in FIG. 3G, in the rotation braking state of the third phase, when a current of a predetermined magnitude flows through the coil 150 in a second direction (here, the direction from the back surface to the front surface of the drawing sheet) opposite to the first direction, the armature 300 starts to move toward the stator 100 (arrow C). The magnetic circuit equivalent to this state is as shown in FIG. 3H. The magnetomotive force in this circuit is Fmg from the permanent magnet 130 and the magnetomotive force Fc from the coil 150 in the direction in which it is added to the magnetomotive force Fmg of the permanent magnet, and the total magnetomotive force obtained by combining these is Fmg+Fc (the magnetic circuit that uses the permanent magnet and the coil as the magnetomotive force source). Since the air gap AG still remains although it is decreasing, RAG is also in a state of having a value, and the total magnetic resistance is RCON+RAG. The magnetic flux at this time is Φ 4. The value of the magnetic flux Φ 4 at this time is larger than the value of the magnetic flux Φ 3. Therefore, the attracting force fsc is stronger than that in the third phase. This is because, contrary to the case of the second phase, when the air gap becomes smaller, the magnetic resistance of the overall magnetic circuit becomes smaller, and accordingly, the magnetic flux passing through the vicinity of the air gap AG becomes larger and the attracting force becomes stronger.

(2) Specifications of the Electromagnetic Braking Device 1

As can be seen from the structure in the vicinity of the armature 300 (see FIG. 2 and FIGS. 3A to 3H), it can be understood that the behavior and state of the armature 300 are the combination of the "spring force fsp" of the coil springs 200 and the "attracting force fsc" of the magnetic flux Φ generated by the magnetic circuit (strictly speaking, the magnetic flux Φ passing between the armature 300 and the one end surface 112 and/or the other end surface 122 of the stator magnetic circuit member 105).

Figure 4:
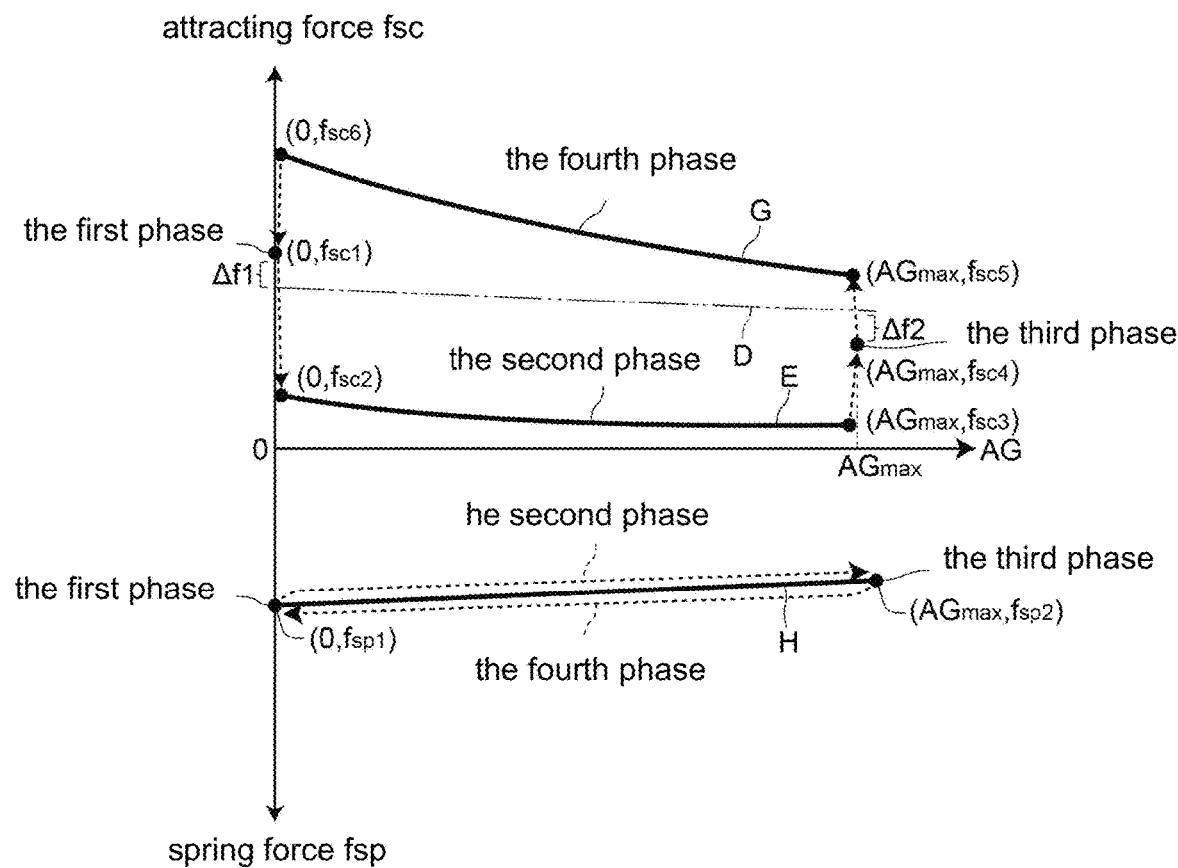
FIG. 4 is a graph showing a force (attracting force fsc) by a stator 100 that attracts an armature 300 and a force (spring force fsp) of a biasing member 200 that biases the armature 300, in relation to the position of the armature 300.

Here, "specifications" such as the strength of the spring (spring constant, arrangement position of the spring (contraction amount of the spring), magnetomotive force of the permanent magnet, magnetomotive force of the coil, permeability of the yoke, and maximum value AGmax of the air gap can be appropriately set as long as the operation and effects of the present invention are achieved, but in the present embodiment, the electromagnetic braking device 1 is configured to set these "specifications" so as to produce the spring force fsp and the attracting force fsc as shown in FIG. 4, for example (details will be described below).

(3) Relationship Between Spring Force Fsp and Attracting Force Fsc, and Movement of Armature 300

FIG. 4 is a graph showing the relationship between a force (the attracting force fsc) attracting the armature 300 by the stator 100 and a force (the spring force fsp) for biasing the armature 300 by the biasing member 200 on the vertical axis and the position of the armature 300 on the horizontal axis. A two dot chain line indicated by reference symbol D in the plus region of the vertical axis is a curve of "an absolute value |fsp| of the spring force" shown for comparing the magnitude of the spring force fsp and the magnitude of the attracting force fsc in states without a reference symbol. The arrows in the drawing indicate the direction of phase transition. The position of the armature 300 on the horizontal axis in the graph can be said to be the gap between the yokes (the first yoke 110 and the second yoke 120) and the armature 300, and specifically corresponds to the air gap AG between the surface of the armature 300 on the stator 100 side and the one end surface 112 and/or the other end surface 122 of the stator magnetic circuit member 105.

Hereinafter, the relationship between the spring force fsp and the attracting force fsc, and the movement of the armature 300, in the electromagnetic braking device 1 will be described with reference to FIG. 4 (and also FIGS. 3A to 3H).

(3-1) First Phase (Self-Maintaining Rotatable State)

The first phase is a phase in which the rotatable state is self-maintaining.

In the graph, when the electromagnetic braking device 1 is in the first phase (when AG=0), the coordinates (0, fsc1) taken by the attracting force are higher by Δf1 than the coordinates of the absolute value of the spring force indicated by the curve D. In other words, in the rotatable state in which the rotation shaft 700 is rotatable, the magnitude of the force (the attracting force) fsc1 that attracts the armature 300 by the magnetic circuit that uses the permanent magnet 130 as the magnetomotive force source exceeds the magnitude of the force (the spring force or the biasing force) fsp1 that the armature 300 is biased by the biasing member 200.

In the first phase, energization to the coil 150 is OFF. In the magnetic circuit of the first phase, the magnetomotive force source is only the permanent magnet 130, and it would seem that the attracting force fsc cannot be sufficiently drawn out only by this. However, if the specifications are optimally set by making good use of the fact that the attracting force generally varies depending on the position of the armature (generally, the smaller the air gap AG is, the smaller the magnetic resistance RAG is and the larger the attracting force acting on the armature is), the attracting force fsc by the permanent magnet 130 alone can exceed the spring force fsp.

As described above, the electromagnetic braking device 1 is configured such that in the first phase the attracting force fsc always exceeds the spring force fsp even while the energization of the coil 150 is OFF (see FIGS. 3A and 3B), the armature 300 is always attracted toward the stator 100, and the armature 300 is kept in contact with the one end surface 112 and the other end surface 122 of the stator magnetic circuit member 105.

(3-2) Second Phase (Transition from Rotatable State to Rotation Braking State)

The second phase is a phase in the process transitioning from the first phase (rotatable state) to the third phase (rotation braking state).

When the current of the predetermined magnitude in the first direction (see FIG. 3C) flows through the coil 150 in the state of the first phase, as described above, the magnetomotive force Fc is generated by the coil 150 in a direction in which the magnetomotive force Fmg of the permanent magnet is reduced, the total magnetomotive force after combining becomes Fmg-Fc, and as a result, the attracting force fsc is weakened.

When the phase shifts from the first phase to the second phase, the attracting force is weakened by the above-described principle, and the coordinates taken by the attracting force in the first phase temporarily shift from (0, fsc1) to (0, fsc2). At this time, since the absolute value |fsp1| of the spring force exceeds the attracting force fsc2 as shown in the graph, the armature 300 separates from the stator 100 (the air gap AG also increases accordingly). Since the attracting force changes depending on the position of the armature as described above, the attracting force fsc changes along the curve E of the graph as the armature 300 moves (as AG changes). On the other hand, since the spring force fsp changes in accordance with the contraction amount of the spring, the spring force fsp also changes along the straight line H of the graph as the armature 300 moves. Then, when the rotation braking state is established and the air gap is widened to a point where the armature 300 cannot move any more, the coordinates taken by the attracting force fsc become (AGmax, fsc3). During this time, the attracting force fsc (curve E) is always smaller than the absolute value of the spring force (curve D) of the spring force.

That is, when transitioning from the rotatable state to the rotation braking state in which the rotation of the rotation shaft 700 is braked (second phase), the magnitude of the force (the attracting force fsc) attracting the armature 300 by the magnetic circuit with the permanent magnet 130 and the coil 150 as the magnetomotive force source is smaller than the magnitude of the biasing force (the spring force fsp).

In other words, the electromagnetic braking device 1 is configured so that when the current of the predetermined magnitude in the first direction flows through the coil 150 while in the rotatable state, the armature 300 moves toward the brake disk 400 side and contacts the brake disk 400 to shift to the "rotation braking state" in which rotation of the rotation shaft 700 is braked.

(3-3) Third Phase (Self-Maintaining Rotation Braking State)

The third phase is a phase in which the rotation braking state is maintained.

In the graph, when the electromagnetic braking device 1 is in the third phase (when AG=AGmax), the coordinate (AGmax, fsc4) taken by the attracting force is lower by an amount Δf2 than the coordinate of the absolute value of the spring force as indicated by the curve D. In other words, in the rotation braking state, the magnitude of the force (the attracting force) fsc4 attracting the armature 300 by the magnetic circuit that uses the permanent magnet 130 as the magnetomotive force source is smaller than the magnitude of the biasing force (the spring force) fsp2.

As described above, the electromagnetic braking device 1 is configured such that in the third phase the spring force fsp is always greater than the attracting force fsc while the energization of the coil 150 is OFF (see FIGS. 3E and 3F), and the brake disk 400 is held in a state of being sandwiched between the armature 300 and the fixed disk 500 while being in contact therewith.

(3-4) Fourth Phase (Transition from Rotation Braking State to Rotatable State)

The fourth phase is a phase in the process of transitioning from the third phase (rotation braking state) to the first phase (rotatable state).

When the current of the predetermined magnitude in the second direction (see FIG. 3C) opposite from the first direction flows through the coil 150 while in the state of the third phase, as described above the magnetomotive force Fc is generated by the coil 150 in a direction in which it is added to the magnetomotive force Fmg of the permanent magnet, the total magnetomotive force after combining becomes Fmg+Fc, and as a result, the attracting force fsc is strengthened.

When the phase shifts from the third phase to the fourth phase, the attracting force is increased by the above-described principle, and the coordinates taken by the attracting force in the first phase temporarily shift from (AGmax, fsc4) to (AGmax, fsc5). As shown in the graph, since the attracting force fsc5 exceeds the absolute value |fsp2| of the spring force at this time, the armature 300 approaches the stator 100 (and the air gap AG decreases accordingly). Since the attracting force varies depending on the position of the armature as described above, the attracting force fsc changes along the curve G of the graph as the armature 300 moves (as AG changes). On the other hand, since the spring force fsp changes in accordance with the contraction amount of the spring, the spring force fsp also changes along the straight line H of the graph as the armature 300 moves. Then, when the armature 300 completely comes into contact with the stator 100 and the air gap disappears to a point where the armature 101 cannot move any further, the coordinates of the attracting force fsc become (0, fsc6). During this time, the attracting force fsc (curve G) always exceeds the absolute value of the spring force (curve D) of the spring force.

That is, when transitioning from the rotation braking state to the rotatable state in which the rotation of the rotation shaft 700 is rotatable (fourth phase), the magnitude of the force (the attracting force fsc) attracting the armature 300 by the magnetic circuit with the permanent magnet 130 and the coil 150 as the magnetomotive force source is higher than the magnitude of the biasing force (the spring force fsp).

In other words, the electromagnetic braking device 1 is configured such that when the current having the predetermined magnitude flows through the coil 150 in the second direction opposite to the first direction while in the rotation braking state, the armature 300 moves toward the stator 100, and the brake disk 400 is released from contact between the armature 300 and the fixed disk 500 to shift to the "rotatable state".

(3-5) In the electromagnetic braking device 1, the magnetomotive force of the permanent magnet 130, the spring coefficient of the biasing member 200, and the displacement of the biasing member 200 are set such that Δf2>Δf1. Here, "the displacement of the biasing member 200 is set" can be said to mean that, for example, the magnitude of contraction of the coil springs 200 is set. Specifically, it means that the depth of the spring holes 125 and the dimension of AGmax are appropriately set.

However, the difference in the rotatable state (first phase) between the magnitude |fsc1| of the force attracting the armature 300 from the magnetic circuit that uses the permanent magnet 130 as the magnetomotive force source and the magnitude |fsp1| of the force biasing the armature 300 from the biasing member 200 is Δf1, and the difference in the rotation braking state (third phase) between the magnitude |fsc4| of the force attracting the armature 300 from the magnetic circuit that uses the permanent magnet 130 as the magnetomotive force source and the magnitude |fsp2| of the force biasing the armature 300 by the biasing member 200 is Δf2 (see FIG. 4).

(3-6) As can be seen from FIG. 4, the slope of the curve E (0, fsc2) to (AGmax, fsc3) or of the curve G (AGmax, fsc5) to (0, fsc6) of the attracting force fsc is greater than the slope of the curve H (0, fsp1) to (AGmax, fsp2) of the spring force fsp. That is, in the electromagnetic braking device 1, with respect to displacement (horizontal axis) of the armature 200, the specifications are set such that the rate of change of the attracting force fsc from the stator 100 is higher than the rate of change of the biasing force fsp from the biasing member 200.

As can be understood from the above description, in the electromagnetic braking device 1 according to the embodiment, the force applied to the armature 300 is roughly divided into two types of forces: the biasing force (the spring force fsp) from the biasing member 200 and the attracting force (fsc) from the magnetic circuit around the stator 100. Note that the attracting force (fsc) can be generated as an attracting force that uses the permanent magnet 130 as the magnetomotive force source and as an attracting force using the coil 150 as the magnetomotive force source.

On the one hand, the magnetomotive force Fmg derived from the permanent magnet 130 is generated as a fixed bias (the attracting force derived from the permanent magnet 130 is always generated to some extent).

On the other hand, with respect to the magnetomotive force Fc derived from the coil 150, the manner of generating the magnetomotive force Fmg can be controlled as intended by appropriately controlling energization to the coil (energization/non-energization (OFF) control to the coil 150, control of the direction of current flow such as the first direction/second direction when energization is performed, control of the magnitude of current, and the like).

Thus, the electromagnetic braking device 1 according to the embodiment can perform self-maintaining by being configured so that the attracting force only by the permanent magnet 130 exceeds the spring force fsp while making use of the fact that the magnetic resistance RAG changes depending on the position of the armature 300 (depending on the size of the air gap AG) and also is configured so that, during the transition between the "rotatable state" and the "rotation braking state", the attracting force fsc can exceed/fall below the biasing force fsp by increasing (adding)/decreasing the attracting force fsc by changing the direction of the current flowing through the coil 150.

3. Effects of the Electromagnetic Braking Device 1 According to the Embodiment (1) The electromagnetic braking device 1 according to the embodiment includes the biasing member 200 that presses the armature 300 in the direction in which the brake disk 400 is disposed, and because it is configured as described above, in the rotation braking state, the biasing force primarily by the biasing member 200 contributes to braking. Therefore, as compared with a conventional self-maintaining type electromagnetic braking device, in which braking is performed by moving the armature relying only on the magnetomotive force of the permanent magnet (see Patent Document 4), a stronger braking force can be stably exerted.

The electromagnetic braking device 1 further includes the permanent magnet 130 as the stator magnetic circuit member 105, in addition to the yokes (the first yoke 110 and the second yoke 120). In the rotatable state, the armature 300 can be held in contact with the one end surface 112 and the other end surface 122 of the stator magnetic circuit member 105 by the magnetic circuit that uses this permanent magnet 130 as the magnetomotive force source, even while energization of the coil 150 is OFF.

Therefore, in the electromagnetic braking device of the present invention, it is not necessary to constantly supply the current to the coil in the rotatable state as in a conventional non-excitation actuation type electromagnetic braking device (see Patent Documents 1 to 3), and it is the electromagnetic braking device that is more power-saving than conventional.

As described above, the electromagnetic braking device 1 according to the embodiment achieves power saving while stably exerting the strong braking force.

(2) The electromagnetic braking device 1 according to the embodiment includes the above-described biasing member 200, and also the stator 100 includes, in addition to the coil 150, the permanent magnet 130 as a constituent element of the stator magnetic circuit member 105. At this time, it is configured such that "in the rotatable state, the magnitude of the force attracting the armature 300 by the magnetic circuit that uses the permanent magnet 130 as the magnetomotive force source is greater than the magnitude of the force biasing the armature 300 by the biasing member 200" and, "in the rotation braking state, the magnitude of the force attracting the armature 300 by the magnetic circuit that uses the permanent magnet 130 as the magnetomotive force source is less than the magnitude of the biasing force."

For this reason, the rotatable state and the rotation braking state can be maintained without causing current to flow through the coil 150, and it is a power-saving electromagnetic braking device.

In addition, in the rotation braking state, the biasing force primarily by the biasing member 200 contributes to braking. Therefore, as compared with the conventional self-maintaining type electromagnetic braking device, in which braking is performed by moving the armature relying only on the magnetomotive force of the permanent magnet (see Patent Document 4), the stronger braking force can be stably exerted.

The electromagnetic braking device 1 according to the embodiment is also configured such that "when transitioning from the rotatable state to the rotation braking state, the magnitude of the force attracting the armature 300 by the magnetic circuit that uses the permanent magnet 130 and the coil 150 as the magnetomotive force source falls below the magnitude of the biasing force" and "when transitioning from the rotation braking state to the rotatable state, the magnitude of the force attracting the armature 300 by the magnetic circuit that uses the permanent magnet 130 and the coil 150 as the magnetomotive force source exceeds the magnitude of the biasing force".

Therefore, the armature can be moved to the brake disk side or to the stator side using the magnetomotive force of the coil like a lever, and the armature can be arbitrarily moved back and forth between the rotatable state and the rotation braking state.

As described above, the electromagnetic braking device 1 according to the embodiment is power saving while stably exerting the strong braking force.

(3) The permanent magnet 130 is disposed to one side of the one end of the U shape close to the central axis AX of the rotation shaft 700 (to the side of the first yoke 110) and at a position closer to the one end surface 112.

In this way, by arranging the permanent magnet 130 as a magnetic force source at a position close to the central axis AX, it can be expected that the strong attracting force is generated at a position closer to the rotation shaft 700, and more stable braking can be obtained. Further, by disposing the permanent magnet 130 at the position closer to the one end surface 112, it can be expected that a relatively large magnetic flux will be generated at a position close to the surface (the one end surface 112) that is in contact with the armature 300, and the armature can be attracted efficiently.

(4) It is configured so that W2<W1, wherein W1 is the width of the permanent magnet 130 in the direction perpendicular to the central axis AX and W2 is the width of the one end surface 112 of the first yoke 110, or the other end surface 122 of the second yoke 120, in the direction perpendicular to the central axis AX. Therefore, since the width W2 of the one end surface 112 or the other end surface 122 through which the magnetic flux passes to the armature 300 side is narrower than the width W1 of the permanent magnet 130 as the magnetomotive force source, the magnetic flux Φ can be induced in a narrow width to increase the density of the magnetic flux, thereby efficiently attracting the armature. Furthermore, this effect can be further enhanced by making it so that $W2<(W\frac{1}{2})$.

(5) Assuming that the difference between |fsc1| and |fsp1| is Δf1 and the difference between |fsc4| and |fsp2| is Δf2, then the magnetomotive force of the permanent magnet 130, the spring coefficient of the biasing member 200, and the displacement of the biasing member 200 are set such that Δf2>Δf1. In other words, the force Δf2 with which the armature contacts against the brake disk in the rotation braking state is set to be larger than the force Δf1 with which the armature contacts against the first yoke and/or the second yoke in the rotatable state. Therefore, the electromagnetic braking device 1 according to the embodiment can stably exert the even stronger braking force.

(6) The brake disk 400 includes the spacer disk 410 and brake pads 420 disposed on both surfaces of the spacer disk 410 so as to sandwich the spacer disk 410.

The brake pads 420 may be omitted from the brake disk 400, and the brake disk 400 may be constituted only by the spacer disk 410, but in this case, contact between the brake disk 400 and the armature 300 and between the brake disk 400 and the fixed disk 500 become metal-to-metal contact. For this reason, when the armature 300 hits the brake disk 400 in order to brake rotation, the friction surface may be irregularly abraded, and accordingly, the state of friction is likely to fluctuate, and stable friction might not be obtained. On the other hand, when the brake pads 420 are disposed on both surfaces of the spacer disk 410 as in the embodiment, stable friction can be obtained without causing the above-described problem.

Although the present invention has been described based on the above embodiments, the present invention is not limited to the above embodiments. The present invention can be implemented in various aspects without departing from the gist thereof, and for example, the following modifications are also possible.

(1) The number, material, shape, position, size, and the like of the components described in the above-described embodiment are examples, and can be changed within a range not impairing the effects of the present invention.

Figure 5:
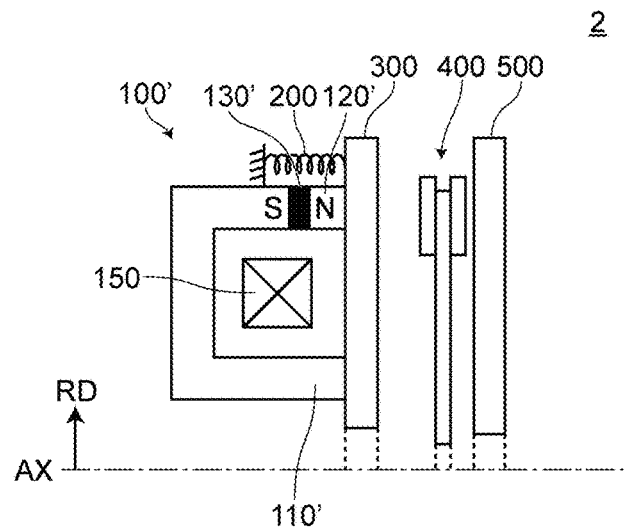
FIG. 5 is an enlarged cross-sectional view of a main part of an electromagnetic braking device 2 according to a modification.
Figure 6:
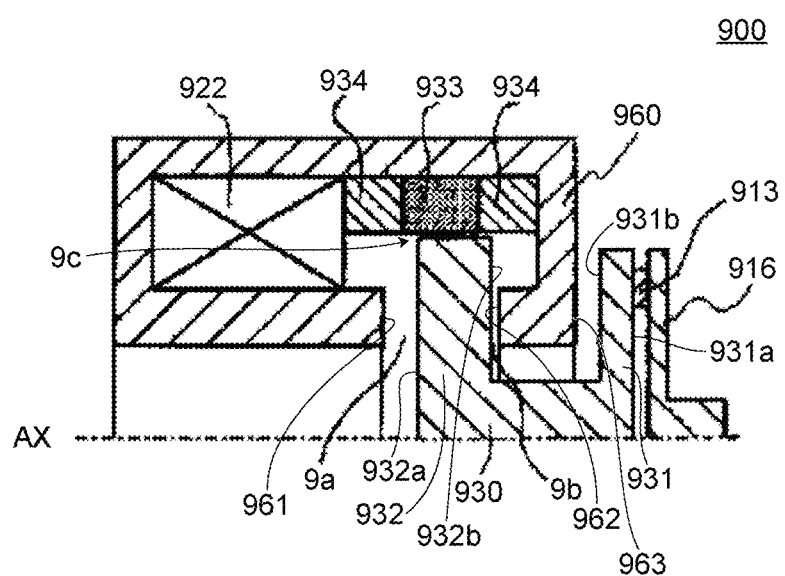
FIG. 6 is a view showing configuration of an electromagnetic braking device 900 described in Patent Document 4.

(2) In the example described in the embodiment, it was described that the permanent magnet 130 is disposed to one side of the one end of the U shape closer to the central axis AX of the rotation shaft 700 and at the position closer to the one end surface 112. However, the present invention is not limited thereto. For example, as shown in FIG. 5, the permanent magnet 130' may be disposed to the side of the other end of the U shape far from the central axis AX of the rotation shaft (not shown) and at a position close to the other end surface. FIG. 5 is an enlarged cross-sectional view of main portions of an electromagnetic braking device 2 according to a modification, and corresponds to FIG. 3A.

The invention claimed is:

1. An electromagnetic braking device for braking movement of a rotation shaft of a braking target, the electromagnetic braking device comprising:
a brake disk rotatable integrally with the rotation shaft and slidable along a central axis of the rotation shaft;
a fixed disk disposed facing one side of, and coaxially with, the brake disk;
an armature disposed facing another side of, and coaxial with, the brake disk, and slidable along the central axis;
a biasing member for biasing the armature in a direction in which the brake disk is disposed; and
a stator disposed with respect to the armature on a side opposite to a side where the brake disk is disposed, and capable of generating a magnetic force for attracting the armature in a direction away from the brake disk, wherein
the stator includes a coil and a stator magnetic circuit member, which includes a first yoke, a permanent magnet, and a second yoke, the stator magnetic circuit member has a substantial U shape that surrounds the coil in a cross-sectional view of a surface obtained by cutting by a plane including the central axis, and is disposed so that one end surface on one end side, and another end surface on another end side, of the U shape face the armature,
elements of the stator magnetic circuit member are arranged, from one end to another end of the U shape, in order of the first yoke, the permanent magnet, and the second yoke,
at least one of the one end side and the another end side of the U shape stator magnetic circuit member includes a first portion having a first width and a second portion having a second width which is narrower than the first width of the first portion when viewed in the cross-sectional view of the surface obtained by cutting by the plane including the central axis of the stator,
a portion between the first portion and the second portion of the stator magnetic circuit member is stepped on a portion closer to the armature than a center of the coil,
the permanent magnet is in the first portion, and
the electromagnetic braking device is configured so that
in a rotatable state in which the rotation shaft is rotatable, the armature is held in contact with the one end surface and the other end surface of the stator magnetic circuit member even while energization to the coil is OFF,
when, while in the rotatable state, a current of a predetermined magnitude in a first direction flows through the coil, the armature moves toward the brake disk and contacts the brake disk to shift to a rotation braking state in which rotation of the rotation shaft is braked,
in the rotation braking state, the brake disk is held in a state of being sandwiched between the armature and the fixed disk while being in contact therewith even while energization of the coil is OFF, and
when, while in the rotation braking state, a current having a predetermined magnitude flows through the coil in a second direction opposite to the first direction, the armature moves toward the stator, and the brake disk is released from contact between the armature and the fixed disk to shift to the rotatable state.

2. The electromagnetic braking device according to claim 1, wherein
in the rotatable state, Δf1 is a difference between a magnitude of a force attracting the armature by a magnetic circuit that uses the permanent magnet as a magnetomotive force source and a magnitude of a biasing force biasing the armature by the biasing member,
in the rotation braking state, Δf2 is a difference between the magnitude of the force attracting the armature by the magnetic circuit that uses the permanent magnet as the magnetomotive force source and the magnitude of the biasing force biasing the armature by the biasing member, and
a magnetomotive force of the permanent magnet, a spring coefficient of the biasing member, and displacement of the biasing member are set such that Δf2>Δf1.

3. The electromagnetic braking device according to claim 1, wherein
the permanent magnet is disposed to the one end side of the U shape close to the central axis of the rotation shaft and at a position closer to the one end surface.

4. The electromagnetic braking device according to claim 1, wherein
W2<W1, wherein, in a cross-sectional view of a surface obtained by cutting the electromagnetic braking device by a plane including the central axis, W1 is a width of the permanent magnet in a direction perpendicular to the central axis and W2 is a width of the one end surface of the first yoke, or the other end surface of the second yoke, in the direction perpendicular to the central axis.

5. The electromagnetic braking device according to claim 4, wherein W2<(W1/2).

6. An electromagnetic braking device for braking movement of a rotation shaft of a braking target, the electromagnetic braking device comprising:
a brake disk rotatable integrally with the rotation shaft and slidable along a central axis of the rotation shaft;
a fixed disk disposed facing one side of, and coaxially with, the brake disk;
an armature disposed facing another side of, and coaxial with, the brake disk, and slidable along the central axis;
a biasing member for biasing the armature in a direction in which the brake disk is disposed; and
a stator disposed with respect to the armature on a side opposite to a side where the brake disk is disposed, and capable of generating a magnetic force for attracting the armature in a direction away from the brake disk, wherein
the stator includes a coil and a stator magnetic circuit member, which includes a first yoke, a permanent magnet, and a second yoke,
the stator magnetic circuit member has a substantial U shape that surrounds the coil in a cross-sectional view of a surface obtained by cutting by a plane including the central axis, and is disposed so that one end surface on one end side, and another end surface on another end side, of the U shape face the armature,
elements of the stator magnetic circuit member are arranged, from one end to another end of the U shape, in order of the first yoke, the permanent magnet, and the second yoke,
at least one of the one end side and the another end side of the U shape stator magnetic circuit member includes a first portion having a first width and a second portion having a second width which is narrower than the first width of the first portion when viewed in the cross-sectional view of the surface obtained by cutting by the plane including the central axis of the stator,
a portion between the first portion and the second portion of the stator magnetic circuit member is stepped on a portion closer to the armature than a center of the coil,
the permanent magnet is in the first portion, and
the electromagnetic braking device is configured so that
in a rotatable state in which the rotation shaft is rotatable, a magnitude of a force attracting the armature by a magnetic circuit that uses the permanent magnet as a magnetomotive force source exceeds a magnitude of a biasing force biasing the armature by the biasing member,
when transitioning from the rotatable state to a rotation braking state in which rotation of the rotation shaft is braked, the magnitude of the force attracting the armature by the magnetic circuit with the permanent magnet and the coil as the magnetomotive force source is smaller than the magnitude of the biasing force,
in the rotation braking state, the magnitude of the force attracting the armature by the magnetic circuit that uses the permanent magnet as the magnetomotive force source is smaller than the magnitude of the biasing force, and
when transitioning from the rotation braking state to the rotatable state, the magnitude of the force attracting the armature by the magnetic circuit that uses the permanent magnet and the coil as the magnetomotive force source exceeds the magnitude of the biasing force.

7. The electromagnetic braking device according to claim 6, wherein in the rotatable state, $\Delta f1$ is a difference between the magnitude of the force attracting the armature by the magnetic circuit that uses the permanent magnet as the magnetomotive force source and the magnitude of the biasing force biasing the armature by the biasing member,
in the rotation braking state, $\Delta f2$ is a difference between the magnitude of the force attracting the armature by the magnetic circuit that uses the permanent magnet as the magnetomotive force source and the magnitude of the biasing force biasing the armature by the biasing member, and
the magnetomotive force of the permanent magnet, a spring coefficient of the biasing member, and displacement of the biasing member are set such that $\Delta f2 > \Delta f1$.

8. The electromagnetic braking device according to claim 6, wherein
the permanent magnet is disposed to the one end side of the U shape close to the central axis of the rotation shaft and at a position closer to the one end surface.

9. The electromagnetic braking device according to claim 6, wherein
W2<W1, wherein, in a cross-sectional view of a surface obtained by cutting the electromagnetic braking device by a plane including the central axis, W1 is a width of the permanent magnet in a direction perpendicular to the central axis and W2 is a width of the one end surface of the first yoke, or the other end surface of the second yoke, in the direction perpendicular to the central axis.

10. The electromagnetic braking device according to claim 9, wherein W2<(W1/2).

* * * * *